United States Patent [19]

Kuhfus

[11] 3,946,171

[45] Mar. 23, 1976

[54] MULTIPLE PUSHBUTTON SWITCH ASSEMBLY FOR TELEPHONE SETS AND THE LIKE

[75] Inventor: Gerd Kuhfus, London, Canada

[73] Assignee: Northern Electric Company, Limited, Montreal, Canada

[22] Filed: June 17, 1974

[21] Appl. No.: 479,744

[52] U.S. Cl.................. 200/5 R; 200/309; 200/330
[51] Int. Cl.².................................. H01H 13/02
[58] Field of Search...... 200/1 R, 1 A, 5, 18, 153 T, 200/302, 309, 324, 325, 329–340, 293, 159 R

[56] References Cited
UNITED STATES PATENTS

| | | | |
|---|---|---|---|
| 2,491,168 | 12/1949 | Dusek | 200/5 E |
| 2,790,859 | 4/1957 | Tseng et al. | 200/5 R |
| 2,821,582 | 1/1958 | Kimball et al. | 200/5 E X |
| 2,944,120 | 7/1960 | Ruben | 200/5 R |
| 2,966,559 | 12/1960 | Meyer | 200/6 R |
| 3,155,806 | 11/1964 | Klingenberg | 200/5 R X |
| 3,179,756 | 4/1965 | Feher, Jr. | 200/5 EB |
| 3,659,061 | 4/1972 | Andreaggi | 200/5 EA |

FOREIGN PATENTS OR APPLICATIONS

| | | | |
|---|---|---|---|
| 1,490,542 | 7/1969 | Germany | 200/309 |

*Primary Examiner*—James R. Scott
*Attorney, Agent, or Firm*—Sidney T. Jelly

[57] ABSTRACT

For telephone sets and similar forms of apparatus in which pushbuttons are mounted more or less flush with the outside surface and actuated by pivoting, a series of such pushbuttons are mounted on a shaft secured in a housing. The pushbuttons are mounted on the shaft at one end and at the other end rest on pushbutton switch mechanisms. Each button is identical and interchangeable. Locating formations on buttons and housing interengage to locate the pushbuttons. The switch mechanisms are spring loaded and urge pushbuttons to a non-actuated position. Indicator windows for removable and interchangeable indicators can be provided.

4 Claims, 7 Drawing Figures

MULTIPLE PUSHBUTTON SWITCH ASSEMBLY FOR TELEPHONE SETS AND THE LIKE

This invention relates to pushbutton switch assemblies such as for telephones and communication equipment, and in particular to such equipment in which the pushbutton switches are actuated by pivotally mounted pushbuttons. The invention also relates to telephone housings and the like, including pushbutton switches.

Pushbutton switches are used in many types of telephone sets, such as for connecting the telephone set to one of a series of available lines, for selectively actuating different circuits and the like. Generally, the pushbutton switches are actuated with pushbuttons which extend up through the cover of the telephone set. Such buttons tend to detract from the appearance of the set, may collect dirt and in themselves are not very attractive.

The present invention provides for pivotally mounted pushbuttons which can be mounted so as to be flush with the cover of the telephone set or other apparatus. The buttons are interchangeable, can have provision for indicator windows, are easily installed and removed, and are attractive looking.

Broadly a series of pushbuttons are each pivotally mounted at one end on a shaft secured in a housing and rest on a pushbutton switch mechanism. The switch mechanism is itself spring loaded and acts to hold the related pushbutton in a non-operated position. Locating positions on each button and on the set housing provide for accurate location of the pushbutton relative to the housing.

The invention will be readily understood by the following description of an embodiment in use in a telephone set, by way of example only, in conjunction with the accompanying drawings, in which.

Figure 1:
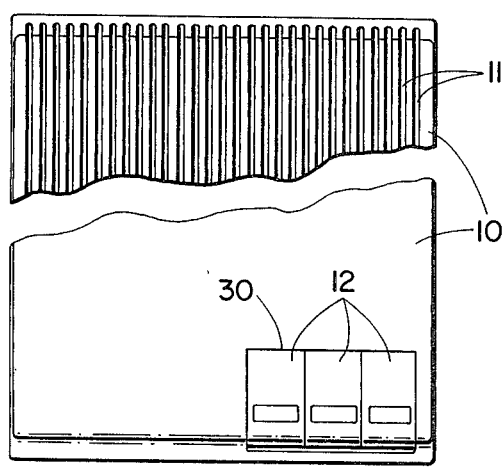
FIG. 1 is a plan view of a top cover of one form of a telephone set, illustrating the use of a series of three pushbutton switches.

FIG. 1 shows the top cover or housing 10 of a telephone set, the set provided with a speaker beneath the grill 11. A microphone is mounted in the base of the telephone set and is not seen. The telephone set illustrated in the particular embodiment is for use with a conventional telephone set having a handset and is intended to permit use of the conventional set without removal of the handset.

Figure 2:
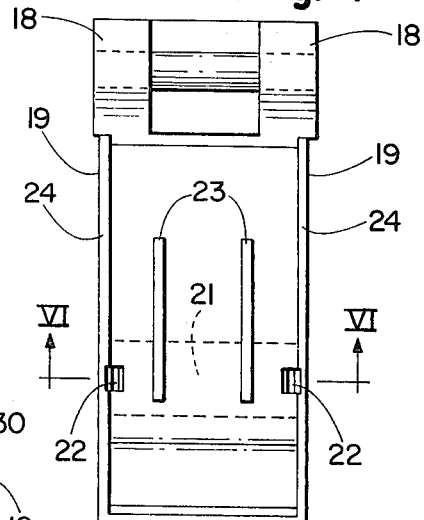
FIG. 2 is an underneath view of a pushbutton.

The cover 10 is provided with three pushbuttons 12. Each button is identical and is seen in more detail in FIGS. 2–5. Specifically considering one pushbutton, the button is rectangular in plan form, as seen in FIGS. 1 and 2. The button has a top surface or web 14, the forward end of which curves round and down at 15 to match the profile of the cover, and a front face or web 16 which is recessed, or set back. At the bottom of the recessed web 16 is a projection 17 the purpose of which will be described later. At the rear end the pushbutton has two spaced apart bosses 18. The outer edges of the bosses are inset a very small amount from the edges 19 of the button to provide a small degree of clearance between buttons and between the outer button and the aperture in which the buttons are set. The tops of the bosses are recessed at 20.

Formed in the top web 14, at a position just rearward of the curved portion 15, is a recess 21. The recess 21 extends for a major distance across the pushbutton, as seen in FIG. 1. At each end of the recess 21 is a small aperture 22 which extends right through the web 14. On the undersurface of the web 14 are two spaced apart ribs 23, the ribs extending parallel to each other and parallel to and on either side of the longitudinal axis of the pushbutton. Along each side of the button and extending from the undersurface of the web 14 are two further ribs 24. Ribs 24 strengthen the pushbutton and also act to prevent a user from looking into the interior of the telephone set when a button is depressed. This improves the appearance and also avoids inadvertent entry of foreign matter.

Figure 3:
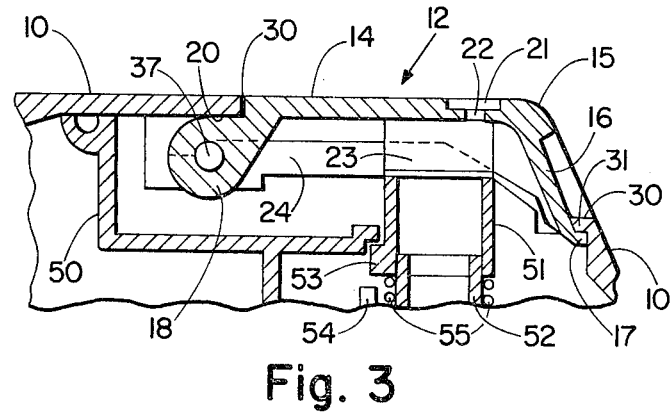
FIG. 3 is a cross-section on the line III—III of FIG. 4, with additional parts of the telephone set in position.

Turning to the cover 10, this has a top web portion 28 and a front web or flange 29 which, viewed in cross-section as in FIG. 1, gives a curved profile. Formed in the top surface 28 and extending into the front web of flange 29, is an aperture 30 for reception of the pushbuttons 12. As seen in FIG. 3, the aperture 30 is of a length, front to back, that the buttons can extend through and be positioned flush with the outer surface of the cover. The bosses 18 are below the cover, the cover fitting into the recess 20 on each button. The forward edge of the aperture 30 has an inwardly extending lip 31. The undersurface of the lip 31 is contacted by the upper surface of the projection 17 on each pushbutton. This provides for accurate positioning location of the pushbuttons relative to the cover.

The assembly of pushbuttons into the cover is simple and quick. Considering FIG. 2, this shows the cover in an upside down position. Extending along each side of the aperture 30 in the cover are ribs 34 and 35. These ribs strengthen the cover at the edges of the aperture 30 and also provide support for a shaft on which the pushbuttons pivot. Additionally they prevent seeing into the interior of the telephone set when one of the outer buttons is depressed. Rib 34 has a hole in alignment with the bores of the bosses 18. Rib 35 also has a hole in alignment with the bores of the bosses; but a small web 36 provides an endwise location for the shaft. As seen in FIG. 2 the shaft is indicated at 37.

Figure 4:
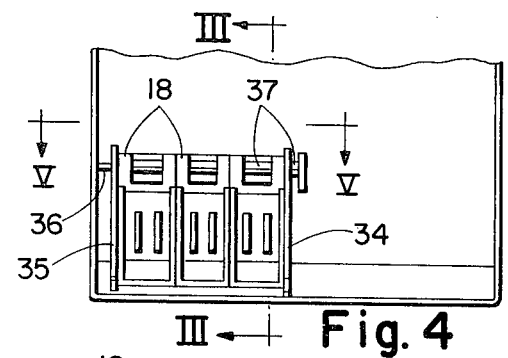
FIG. 4 is an underneath view of part of the top cover of FIG. 1, to a larger scale.
Figure 5:
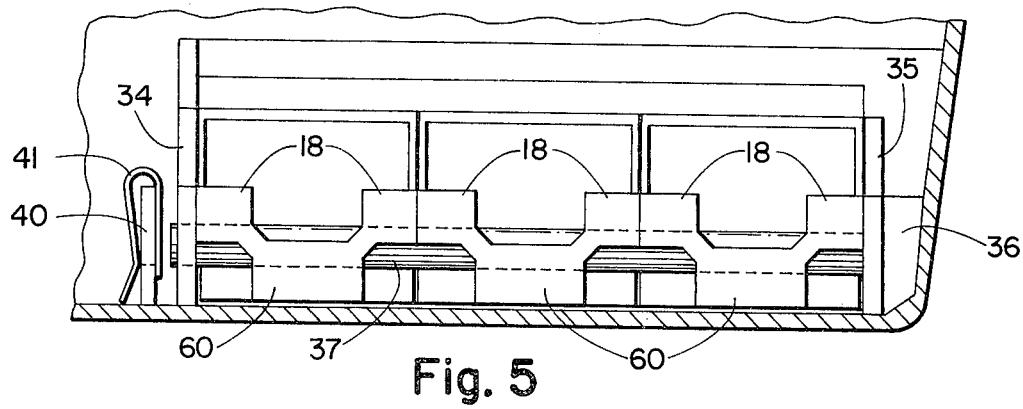
FIG. 5 is a cross-section on the line V—V of FIG. 4.

To assemble pushbuttons and cover, the cover is positioned upside down, as in FIGS. 4 and 5. The three pushbuttons 12 are placed in position. The pushbuttons are located readily by the recesses 20 on the buttons engaging with the periphery of the aperture 30 in the cover and by the projections 17 resting on the lip 31. The shaft 37 is inserted by pushing through the hole in the rib 34 then through the bosses 18 of the pushbuttons 12, and then into the hole in rib 35. The end of the shaft butts against the web 36. The shaft 37 can be left unsecured, but for certainty a further rib 40 is spaced a short distance from rib 34. The rib 40 also has a hole through which the shaft passes completely. When the shaft is in place it is clear of the rib 40. A spring clip 41 is then pushed over the rib 40 and this prevents any substantial endwise movement of the shaft.

It is usual to provide some indication of the function of each pushbutton. Such indication can be obtained by suitable marking molded into the cover at appropriate positions. An alternative way is to provide some form of identification on each pushbutton. With the buttons being identical and interchangeable, such marking or identification should be changeable. Also as the particular function of the pushbutton may vary depending upon the installation, the ability to remove and insert identification numbers is a distinct advantage.

Figure 6:
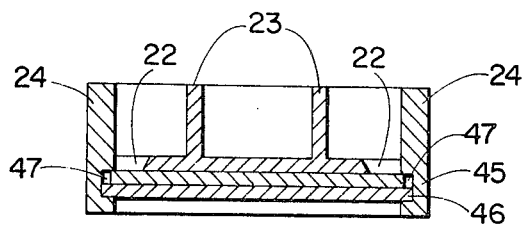
FIG. 6 is a cross-section on the line VI—VI of FIG. 2.

In the embodiment illustrated small removable indicators are fitted into the recess 21 in each button. FIG. 6 is a cross-section along the longitudinal axis of a recess 21, with an indicator in position. In the particular example illustrated, the indicator comprises a thin member 45, for example of thin cardboard or of paper, on which is printed or otherwise impressed an identifying symbol. Over the member 45 is inserted a transparent member 46. Member 46 is typically of fairly rigid plastic and can be colourless, or of a pertinent colour to aid in identification.

Figure 7:
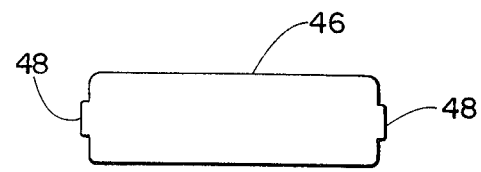
FIG. 7 is a plan view of an indicator member for a pushbutton.

The transparent member 46 is a close fit in the recess 21 but to firmly retain it in the recess, the recess has two small indents or cavities 47, one at each end. Each member 46 has a small tab at each end which clips into an indent or cavity 47. This is seen in FIG. 7 which is a plan view of a member 46, the tabs indicated at 48. The indicator, composed of members 45 and 46, can readily be inserted from the top or outside of the pushbutton and the tabs 48 readily clip into the cavities 47. However, it can only be removed readily from underneath the button. This is done by pushing on the indicator through one of the apertures 22.

FIG. 3 illustrates the inter-relationship of the pushbuttons with the pushbutton switches. Indicated at 50 is a casting which holds the switches, plus other items. In contact with the two ribs 23 is a sliding plunger 51. Plunger 51 is hollow and slides over a guide member 52 which is a fixed member of a switch block. Plunger 51 has one or more lobes or extensions 53. When the plunger moves down, the lobes or extensions 53 actuate spring contacts, indicated at 54. A compression spring 55 acts to maintain the plunger 51 in an upward position and this in turn maintains the related pushbutton 12 in the upward position flush with the cover.

It will be seen that the bosses 18 do not completely enclose the shaft 37 for the full lengths of the bosses. Each boss 18 extends in contact with the shaft for approximately 180°, extending over the top of the shaft 37 as seen in FIG. 4. Between the bosses 18 each button has a formation 60 which can be conveniently considered as a half-boss, being of a channel cross-section. This formation is in contact with the lower half of the shaft 37 as seen in FIG. 4. This form of construction facilitates considerably the molding of the buttons as side coring is avoided.

What is claimed is:

1. A push button switch assembly for pushbutton actuation of switches, comprising:
    a housing, an aperture in said housing, and a plurality of pushbuttons pivotally mounted in said aperture, each of said pushbuttons of rectangular plan form and including pivotting means at a rear end, the pushbuttons extending side-by-side in said apertures;
    parallel spaced apart ribs in said housing, said ribs extending one along each side of said aperture and normal to and away from an outer surface of the housing;
    a shaft extending through said ribs on said housing and through said pivotting means on each of said push-buttons, and
    locating means on each of said pushbuttons to locate each button relative to the housing in a direction corresponding to the pivotal movement of the pushbutton,
    a plurality of switches in said housing beneath said pushbuttons, a switch beneath each pushbutton, each switch including a movable member and resilient means biasing said movable member into contact with an under surface of the related pushbutton, and said movable member biasing said pushbutton to an initial position having a top surface flush with a top surface of said housing.

2. An assembly as claimed in claim 1, said locating means on each pushbutton comprising a formation on a forward end of the pushbutton and adapted to engage with a formation on said housing in an upward, nonoperated position.

3. An assembly as claimed in claim 1, each pushbutton including a recess in an upper surface thereof, and an indicator positioned in said recess.

4. An assembly as claimed in claim 1, said housing comprising a cover for a telephone set, said cover including a top web portion and a front flange, said web portion and front flange having a curved profile, in cross-section, at the junction of web and flange, said aperture in said housing formed at a forward position in said web portion and extending into said front flange, said pushbuttons having a curved front portion to match the profile of said cover.

* * * * *